United States Patent
Morisawa

Patent Number: 5,113,261
Date of Patent: May 12, 1992

[54] LENS DRIVING APPARATUS USING CAM PLATE

[75] Inventor: Tahei Morisawa, Tokyo, Japan

[73] Assignee: Asahi Kogaku Kogyo Kabushiki Kaisha, Tokyo, Japan

[21] Appl. No.: 548,543

[22] Filed: Jul. 5, 1990

[30] Foreign Application Priority Data

Jul. 11, 1989 [JP] Japan .................. 1-178269

[51] Int. Cl.$^5$ .................. H04N 5/225; H04N 5/232
[52] U.S. Cl. .................. 358/225; 359/700
[58] Field of Search ........... 358/225, 209, 229, 227, 358/909, 906, 55, 41; 354/400, 402, 404, 195.1, 195.12; 352/140; 350/429, 570, 255

[56] References Cited

U.S. PATENT DOCUMENTS

| | | | |
|---|---|---|---|
| 3,095,750 | 7/1963 | Mahn | 354/195.1 |
| 3,118,359 | 1/1964 | Leitz et al. | 350/429 |
| 3,765,751 | 10/1973 | Noguchi | 350/255 |
| 3,851,952 | 12/1974 | Werz et al. | 350/255 |
| 3,878,330 | 4/1975 | Novak | 350/429 |
| 3,896,457 | 7/1975 | Yamanishi et al. | 354/404 |
| 3,930,720 | 1/1976 | Uesugi | 350/429 |
| 4,645,310 | 2/1987 | Kohmoto | 350/430 |
| 4,767,200 | 8/1988 | Inaba et al. | 350/429 |
| 4,894,672 | 1/1990 | Tanaka | 354/195.12 |
| 4,914,461 | 4/1990 | Hori | 354/149.1 |
| 4,994,842 | 2/1991 | Itoh et al. | 354/402 |

Primary Examiner—James J. Groody
Assistant Examiner—Safet Metjah
Attorney, Agent, or Firm—Sandler, Greenblum & Bernstein

[57] ABSTRACT

A lens driving apparatus including a lens holder which holds a lens and which is movable in the optical axis direction of the lens, and a rotatable cam plate which is provided on one side of the lens holder and which lies in a plane parallel with the optical axis and which is mounted to rotate about a rotation axis. The lens holder has a cam follower pin, and the cam plate has a cam groove in which the cam follower pin of the lens holder is fitted.

7 Claims, 2 Drawing Sheets

LENS DRIVING APPARATUS USING CAM PLATE

BACKGROUND OF THE INVENTION

1. Field of the Invention

The present invention relates to an apparatus for driving a lens in a camera.

2. Description of Related Art

A lens of a camera is moved in an optical axis direction by a predetermined or desired displacement, in accordance with purposes thereof, such as zooming or focusing, etc. As a lens driving apparatus, especially for the zooming operating usually a cam type of driving apparatus is used which has a circular an cylindrical cam ring coaxial with the lens and a lens holder which is supported for movement in the optical axis direction. The cam ring has cam grooves in which cam follower pins provided on the lens holder are fitted, so that when the cam ring is manually or electrically rotated, the lens holder, holding the lens, can be moved in the optical axis direction in accordance with the cam profile of the cam grooves.

There is no particular problem with the operation per se of the lens driving apparatus. However, the cam ring a component is not only expensive, but also makes it difficult to realize a thin lens driving apparatus. In particular, in case where the lens holder has a non-circular projection which is not coaxial to the lens, the diameter of the cam ring is made larger, thus resulting in a large lens driving apparatus. Furthermore, the cam follower pins provided on the lens holder extend in the radial direction of the lens, and accordingly, the cam grooves formed in the cam ring extend also in the radial direction, so that the cam grooves must be individually machined.

SUMMARY OF THE INVENTION

The primary object of the present invention is to provide a thin and inexpensive lens driving apparatus in which a rotatable planer cam plate is used instead of the conventional cam ring.

Namely, contrary to the common concept, in which it has been considered that a cam ring coaxial to the lens must be used to drive the lens, the lens is driven by a rotatable planer cam plate in the present invention.

To achieve the object mentioned above, according to the present invention, there is provided a lens driving apparatus comprising a lens holder which holds a lens and which is movable in the optical axis direction of the lens, and a rotatable cam plate which is provided on one side of the lens holder and which lies in a plane parallel with the optical axis to rotate about a rotation axis. At least one cam follower pin is provided on the lens holder, and at least one cam groove is formed in the rotatable cam plate, so that the at least one cam follower pin of the lens holder is fitted in the at least one cam groove, and a driving device is provided for rotating the cam plate about the rotation axis.

Thus, one of the most significant features of the present invention is directed to the rotatable cam plate which lies in a plane parallel with the optical axis to rotate about a rotation axis, in place of the conventional cam ring. The cam plate has at least one cam groove in which the cam follower pin, provided on the lens holder, which is movable in the optical axis direction, is fitted.

The cam plate rotates in a plane parallel with the optical axis. Therefore, even if the lens holder has a radial projection, it is possible to place the cam plate so as not to interfere with the radial projection without increasing the size of the cam plate, thus resulting in a small and compact lens driving apparatus, unlike the prior art.

If the lens driving apparatus of the invention is used for driving a zoom lens, the cam plate has at least two cam grooves, each driving a power variable lens group of the zoom lens.

On the other hand, in theory, the lens driving apparatus of the invention can be used to drive a focusing lens. Namely, since there is a predetermined relationship between the angular displacement of the cam plate and the axial displacement of the lens in accordance with the cam profile, the angular displacement of the cam plate can be controlled in accordance with the object distance detected by an object distance measuring device to drive the focusing lens. In this case, only one cam groove is formed in the cam plate.

BRIEF DESCRIPTION OF THE DRAWINGS

The invention will be described below in detail with reference to the accompanying drawings, in which.

DESCRIPTION OF PREFERRED EMBODIMENTS

Figure 3:
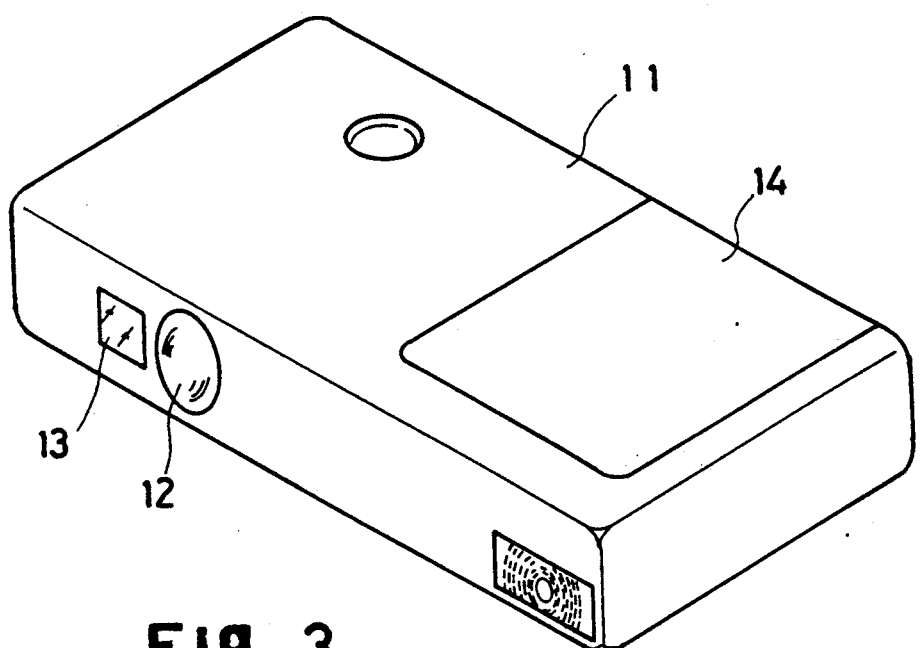
FIG. 3 is a perspective view of a camera in which a lens driving apparatus of the present invention is incorporated.

FIG. 3 shows a still video camera which has a zooming device to which a lens driving apparatus according to the present invention is applied. The camera housing 11 which is of a thin box-shape is provided on its one side with a zoom photographing optical system 12 and a finder optical system 13, the front ends of which appear on the side wall of the housing 11. On the upper face of the housing 11 there is provided a lid 14 through which floppy disk can be inserted and removed from the housing 11.

Figure 1:
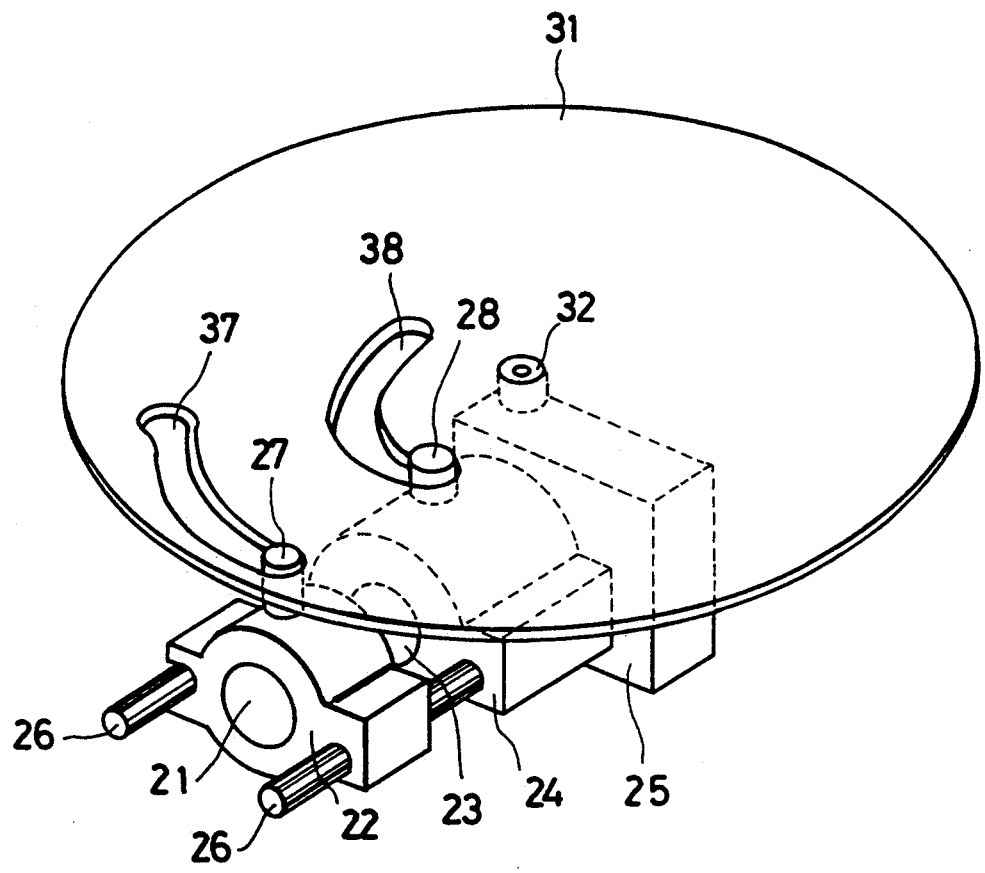
FIG. 1 is a perspective view of a lens driving apparatus according to an aspect of the present invention.
Figure 2:
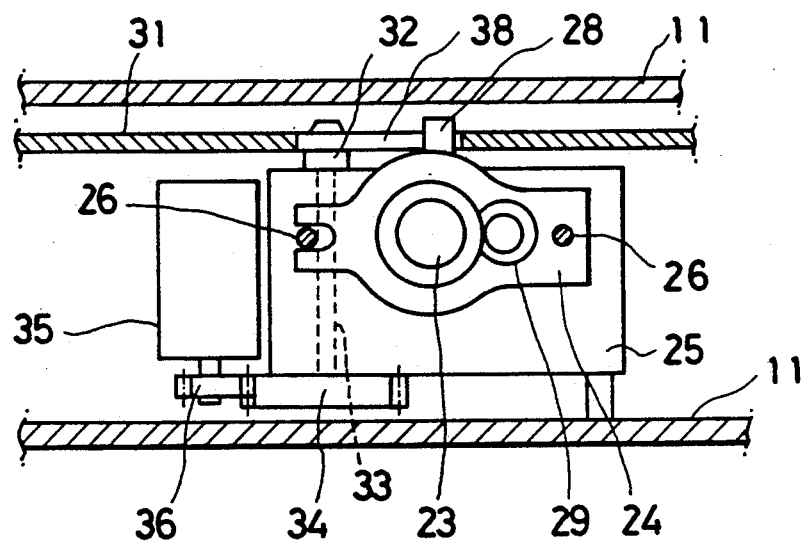
FIG. 2 is a partially sectioned front elevational view of a rear lens holder.

FIGS. 1 and 2 show a zooming apparatus housed in the housing 11. Front and rear lens groups 21 and 23 which form the zoom photographing optical system 12 are held by front and rear lens holders 22 and 24, respectively. In the rear of the rear lens holder 24, an image pick-up block 25 is provided, which has a solid state image pick-up device (not shown) and which is located at a focal position of the zoom photographing optical system 12 and at which an image is formed. The front lens holder 22 and the rear lens holder 24 are slidably supported by a pair of guide rods 26 to reciprocally move in the optical axis direction of the zoom photographing optical system 12. The rear lens holder 24 has a motor 29 (FIG. 2) for driving a diaphragm mechanism (not shown), etc.

The front lens holder 22 and the rear lens holder 24 have, on their upper surfaces, cylindrical cam follower pins 27 and 28, which project in the radial direction of the lens holders. A rotatable circular cam plate 31 is provided above the front and rear lens holders 22 and 24. The cam plate 31 lies in a plane parallel with the optical axis of the lens system, i.e., parallel with the guide rods 26. The cam plate 31 is supported by a bearing (shaft) 32 which is in turn supported on the upper portion of the image pick-up block 25 to rotate about a center axis of the bearing 32. A supporting shaft 33 (FIG. 2), which extends downward from the bearing 32, extends through the image pick-up block 25, so that the lower projecting end of the shaft 33 has a gear 34 secured thereto. The gear 34 is in mesh with a gear 36 which is secured to a drive shaft of a zoom motor 35 provided on one side of the image pick-up block 25.

The cam plate 31 has cam grooves 37 and 38 in which the associated cam follower pins 27 and 28 of the front lens holder 22 and the rear lens holder 24 are fitted. The cam grooves 37 and 38 circumferentially extend to be inclined with respect to the circular periphery thereof, so that the front lens group 21 and the rear lens group 23 are placed at a predetermined position on the optical axis, in accordance with the cam profiles of the cam grooves 37 and 38.

When the zoom motor 35 rotates, the cam plate 31 rotates at a reduced speed by the gears 36 and 34, so that the front lens holder 22 and the rear lens holder 24 are moved to come away from and close to each other in the optical axis direction in accordance with the cam profiles of the cam grooves 37 and 38.

As can be understood from the foregoing, according to the present invention, the zooming operation can be effected by the cam plate, unlike the prior art in which a cam ring is used for the zooming operation. Therefore, it is unnecessary to provide a cam ring which has a diameter considerably larger than the diameter of the front and rear lens groups, in the present invention. This makes it possible to realize a thin zooming apparatus, thus resulting in a small and thin camera.

Furthermore, since the cam plate 31 rotates about an axis, no large space for the linear movement thereof is needed. In addition, the cam grooves 37 and 38 can be more easily formed on the cam plate rather than on the cam ring. For instance, the cam grooves 37 and 38 can be easily machined or punched by a precision press machine or the like.

The rotatable cam plate 31 is not limited to a circular plate, as shown in the drawings, and can be, for example, a sector plate in which the cam grooves 37 and 38 are formed.

Although the above-mentioned embodiment has been applied to a zooming device having two movable lens groups, the present invention can be applied to a zooming device having more than two movable lens groups. In this alternative, the cam plate 31 has cam grooves the number of which corresponds to the number of the lens groups to be driven. If only one lens group is to be driven, only one cam groove is formed on the cam plate 31.

I claim:

1. A lens driving apparatus adapted to drive a lens attached to a camera body, said lens driving apparatus comprising lens holders which are located along the optical axis of the lenses to hold respective lenses and which are movable in the optical axis direction, a rotatable cam plate provided on one side of said lens holders and in a plane parallel with the optical axis and mounted to rotate about a rotation axis, cam follower pins provided on said lens holders, cam grooves formed in said rotation cam plate, so that said cam follower pins of said lens holders are fitted in said cam grooves, and driving means for rotating said cam plate about the rotation axis, wherein said driving means is contained within the camera body.

2. A lens driving apparatus according to claim 1, wherein said lenses held by said lens holders comprise a zoom lens.

3. A lens driving apparatus according to claim 2, wherein said zoom lens is for a still video camera.

4. A lens driving apparatus according to claim 3, wherein a rearmost lens holder is provided on a rear portion with an image pick-up block having a solid state image pick-up device located at a focal position of said zoom lens.

5. A lens driving apparatus according to claim 4, wherein said cam plate is rotatably supported by at least one bearing which is supported by said image pick-up block.

6. A lens driving apparatus according to claim 5, further comprising a shaft which extends through said image pick-up block and a drive for rotating said shaft, so that said cam plate is rotated through said shaft and said drive.

7. A lens driving apparatus for a video camera including an image pick-up block which electrically receives an image through a lens, said apparatus comprising a plurality of lens holders movably in the optical axis direction of the lens and which have a plurality of cam follower pins which extend radially from the optical axis in the same radial direction, and a rotatable cam plate provided on one side of said lens holders which rotates in a plane parallel with the optical axis, said cam plate being provided with a cam groove in which said associated cam follower pins of said lens holders are fitted, wherein said cam plate is rotatably supported by the image pick-up block.

* * * * *